Feb. 2, 1954 — T. EICHMANN — 2,667,898

REGULATING VALVE

Filed July 30, 1947

Inventor
Theophil Eichmann
By Peck & Peck
Attorneys.

Patented Feb. 2, 1954

2,667,898

UNITED STATES PATENT OFFICE 2,667,898

REGULATING VALVE

Theophil Eichmann, Bern, Switzerland, assignor to George B. Scarlett, Kennett Square, Pa.; William J. Scarlett, administrator of George B. Scarlett, deceased Application July 30, 1947, Serial No. 764,793
In Switzerland September 4, 1945

Section 1, Public Law 690, August 8, 1946
Patent expires September 4, 1965

3 Claims. (Cl. 137—685)

This invention relates to regulating valves; and the nature and objects of the invention will be readily apparent to and understood by those skilled in the arts involved, in the light of the following explanation and detailed description of the accompanying drawings illustrating what I now believe to be a preferred embodiment or mechanical expression of the invention from among various other embodiments, forms, arrangements, constructions, and combinations, of which the invention is capable and for which it is adapted within the spirit and scope thereof as defined by the appended claims.

The invention is directed generally to those types of regulating valves in which the valve is automatically actuated from and controlled by a flexible diaphragm actuated and controlled by pressure variations in a pressure chamber; and it is particularly concerned with such types of valves in an association with automatic refrigerating apparatus in which the regulating valve automatically controls the flow of refrigerant to the evaporator of the refrigerating apparatus in accordance with temperature variations which are translated as pressure fluctuations or variations acting on the flexible diaphragm of the regulating valve to actuate and control such valve.

A main object of my invention is to provide a design, arrangement and construction of such a diaphragm controlled regulating valve by which the sensitiveness of the valve in operation will be substantially increased, so that, when such a valve is used, for example, in an automatic refrigerating apparatus, the valve will maintain such precision of control over the refrigerant to the evaporator of the refrigerating apparatus that a substantially constant pressure will be maintained in the evaporator during and under the various conditions encountered in operation and use of the apparatus.

And in carrying out the above main object, a regulating valve of my invention is basically characterized by the fact that the movements transmitted to the regulating valve from the flexible diaphragm, as the diaphragm is flexed by variations of the pressure to which it is subjected, are substantially magnified or multiplied through the medium of motion multiplying transmission means which operatively associates the diaphragm with the regulating valve.

Another object of the invention is to provide for precision adjustment in the operative connection of the flexible diaphragm with the motion multiplying transmission means.

Another object is to provide an improved mounting for the regulating spindle for the needle valve, in which the regulating spindle includes an axially movable spring support for the spindle.

With the foregoing and certain objects and results in view, which will be readily apparent from the following description and explanation, the invention consists in certain novel features in construction of parts and elements and in the combinations thereof, all as will be more fully referred to and set forth hereinafter.

Referring to the accompanying drawings, in which similar reference characters refer to corresponding parts throughout the several figures thereof:

Figure 1:
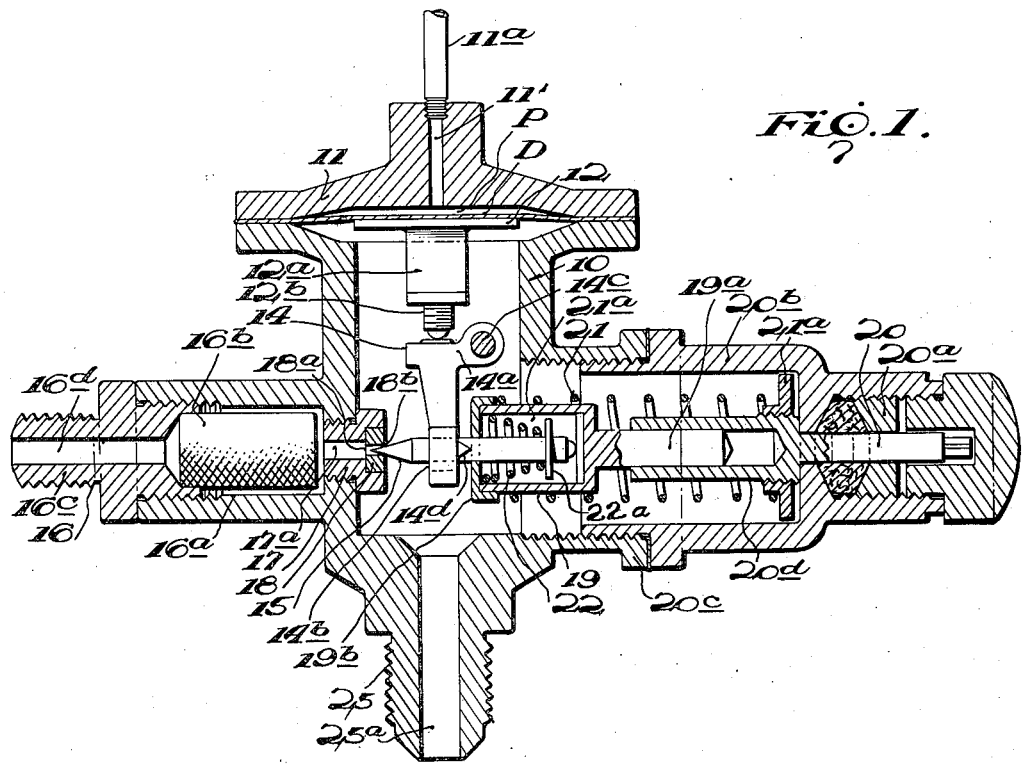
Fig. 1 is a vertical sectional view through a regulating valve of my invention of a type particularly intended for use with automatic refrigerating apparatus.

In the example of regulating valve of my invention, which I have disclosed herein for purposes of explanation, the valve is of the type designed for use as the automatic regulating valve for a refrigerating apparatus. However, my invention is not limited to embodiment in such types but is adapted to and intended for embodiment in diaphragm regulating valves generally. The valve as embodied in the example, includes a valve casing 10, which at one end thereof mounts a flexible diaphragm D which extends across the casing and is secured in position between the casing and a closure head 11, so that, there is formed between the outer side of diaphragm D and the inner side of closure head 11, a pressure chamber P. An axial duct 11' extends through the closure head 11 in communication at its inner end with pressure chamber P, and the outer end of this duct is connected and placed in communication with a pipe or tube 11a which leads to a suitable heat responsive element (not shown) of the usual type for effecting variations in pressure in the pressure chamber P for flexing diaphragm D inwardly or outwardly of casing 10, all in a manner usual in this art.

The inner side of the diaphragm D is operatively associated with and supported on a disk 12 disposed axially relative to the diaphragm, and which is displaceable with the diaphragm D in either direction axially of the casing 10. This disk 12 is carried and supported on the outer end of a stem or stud 12a which extends inwardly of the casing axially of disk 12 and the diaphragm D. An adjusting screw 12b is threaded axially into the inner end of stud 12a and projects a distance inwardly therefrom.

A motion transmitting member in the form of a bell crank 14 having a short arm 14a and a long arm 14b, is pivotally mounted and supported on the casing 10 on a pivot pin 14c disposed transversely of the short arm 14a at one end thereof, pivot pin 14c being positioned in casing 10 with its axis perpendicular to and disposed spaced at one side of the axis of the casing and of diaphragm D and its supporting stud 12a. The bell crank 14 so mounted within casing 10 is positioned with the short arm 14a extending across and adjacent to the inner end of adjusting screw 12b of diaphragm stud 12a, with the inner end of the screw being engaged with the outer side of the bell crank arm 14a, so that, such arm supports the diaphragm D and its associated disk 12 and supporting stud 12a in operative position for movement in either direction axially of the casing 10.

The long arm 14b of bell crank 14 extends inwardly through the casing in position disposed generally axially of the casing and of diaphragm D, and at its inner end is operatively associated with a needle valve 15 and its supporting structure.

The casing 10 is provided with a branch 16 extending radially from one side wall thereof generally opposite the inner end portion of the long arm 14b of bell crank 14. Branch 16 includes a chamber 16a therewithin in which a suitable filter screen 16b is positioned and at its outer end branch 16 is provided with a head 16c having an axial passage 16d therethrough discharging into chamber 16a. In this instance, head 16d is adapted to be connected with the source (not shown) of the liquid cooling means or refrigerant under high pressure of a refrigerating apparatus for flow of such high pressure refrigerant into passage 16d and chamber 16a, as will be understood by those familiar with this art. At the inner end of chamber 16a, a nozzle 17 having an axial discharge passage 17a therethrough, is mounted in the side wall of casing 10 in communication with the inner end of chamber 16a. Nozzle 17 mounts at its inner end a valve seat forming member 18 in the form of a disk of a suitable hard and non-corrosive material, such for example as a semi-precious stone such as agate. The valve seat forming disk 18 is formed with an axial bore 18a therethrough in communication with chamber 16a through the nozzle passage 17a, and the inner end of the axial passage 18a provides a valve seat 18b into which needle valve 15 extends for movements between position sealed therein to close off flow from passage 18a into casing 10 and positions unseated therefrom to control flow into the casing.

The needle valve 15 is mounted and supported in position disposed transversely across casing 10 in axial alignment with the valve seat 18b of nozzle 18, with the needle valve being extended transversely through the inner end of the long arm 14b of bell crank 14. Needle valve 15 is supported in such position by an axially movable support structure 19, which in turn is supported on and is mounted for movement axially of a regulating spindle 20. The spindle 20 is mounted in a suitable packing gland 20a in a head structure 20b which is secured on and in outward extension of a branch 20c of casing 10 at the opposite side of the casing from branch 16. Regulating spindle 20 extends inwardly through head structure 20b and provides a tubular portion 20d in which a stem 19a of the needle valve support structure 19 is reciprocally mounted. Support structure 19 provides a head plate or disk 19b at the inner end thereof which is engaged by spaced knife edges 14d (only one of which is shown) extending from the adjacent side of the long arm 14b of bell crank 14. A coiled expansion spring 21 is mounted over and around the tubular portion 20d of regulating spindle 20 and the support structure 19, between the head plate 19b of structure 19 and a disk 21a which is adjustably threaded on the outer end of the tubular portion 20d of spindle 20 within head structure 20b. Spring 20 loads structure 19 and continuously biases it in a direction toward bell crank arm 14b.

The needle valve 15 is mounted and supported in the structure 19 in position extending axially through head plate 19b of that structure with a coil spring 22 mounted around the stem of the valve within structure 19 between head plate 19b, and a disk 22a fixed on the inner end of the stem of valve 15.

Thus, in normal position, the spring biased needle valve support structure 19 swings and maintains the bell crank 14 in position supporting flexible diaphragm D in outwardly flexed or displaced position as shown in Fig. 1, and maintains needle valve 15 axially moved toward nozzle 17 to seat the valve on the valve seat 18b. Upon increase in pressure in the pressure chamber P, the diaphragm D is flexed or forced inwardly and the bell crank is rocked about its axis 14c and through its engagement by knife edges 14d with the support structure 19, forces this support structure outwardly against the spring mounting 21 which in turn through the spring mounting of the needle valve or structure 19 moves the needle valve outwardly to unseated position from its seat 18b opening nozzle 17 for discharge of refrigerant under pressure into the casing 10. Upon release or decrease of pressure in chamber P, the forces exerted by the spring 21 will again move spring support structure 19 toward nozzle 17 to thereby carry needle valve 15 therewith to seated position on valve seat 18b, or, depending upon the magnitude of the pressure variation in chamber P, to a position decreasing the extent of the opening of the nozzle.

As hereinbefore referred to, the bell crank 14 provides a motion magnifying or multiplying connection for transmitting the movements of the disk 12 caused by flexing of diaphragm D, to the needle valve 15, so that, the movements of the needle valve are substantially magnified or increased relative to the initiating movements of the diaphragm D and its supporting disk 12 and stem or base 12a. This motion magnifying or multiplying functioning of bell crank 14 is effected by the relative positioning and mounting of the short arm 14a and the long arm 14b, so that, motion is applied to the short arm adjacent the pivotal axis of the bell crank while motion is taken off from the outer or free end of the long arm 14b at a considerably greater distance from axis 14c.

In this example, a connection 25 having an axial discharge duct 25a therethrough, is provided extending from the end of casing 10 opposite that end at which diaphragm D is mounted, for discharge of high pressure fluid from the casing. Connection 25 is, in the example of a valve of the invention associated with automatic refrigerating apparatus, connected with a refrigerant evaporator or cooling unit (not shown) in the usual manner with such apparatus. The refrigerant discharged to and expanded in such evaporator is, of course, controlled automatically by the functioning of the pressure controlled needle valve 15.

I have discovered and determined that by the use of a motion magnifying or multiplying transmission means or mechanism in accordance with my invention, such as the bell crank 14 of the illustrated example, the sensitiveness of the operation of the needle valve 15 and the control thereof over the discharge of high pressure refrigerant through the nozzle 17 is greatly increased with the result that there is maintained a practically constant pressure in the evaporator (not shown) of the refrigerating apparatus with which the regulating valve is connected by the connection 25. An evaporator of an automatic refrigerating apparatus operating with a regulating valve of my invention such for example as the embodiment herein illustrated, can operate at full load without any adjustment of the regulating member alternately with +10° C. and —10° C. up to —30° C. of evaporating temperature. Moreover the greatest variation in the overheating temperature when operating at 10° C. at the suction part of the evaporator will amount to less than 1° C.

Figure 2:
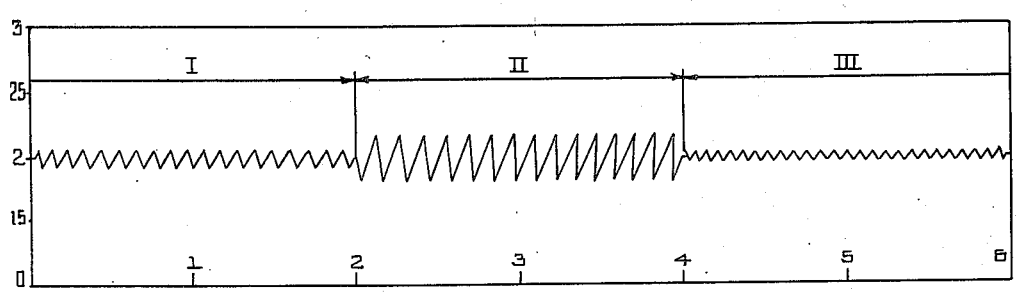
Fig. 2 is a diagrammatic view showing a comparative time-pressure chart or diagram.

In order to graphically illustrate the functioning and results of the use of my regulating valve having the motion magnifying or multiplying transmission from the pressure controlled diaphragm to the refrigerant controlling valve, I have shown in Fig. 2 of the drawings, a time-pressure comparison diagram in which section I thereof indicates an unchanged or equal motion transmission of the movement of the diaphragm D to the regulating valve; section II indicates the effect by motion decreasing or reducing transmission to the valve; while section III graphically illustrates the results obtained by my valve with its greatly magnified or multiplied transmission of motion or movement of the pressure controlled diaphragm. In the illustrated diagram of Fig. 2, the ordinates show evaporating pressure in atmospheres and the abscissae show the time in hours.

Adjustment in the operative connection between the bell crank 14 and the diaphragm D of the present example of my valve, may be effected with precision by means of the adjusting screw 12b. The efficiency of the operation of the valve with substantial elimination of maintenance is obtained through the use of semi-precious stone, such as agate, for the valve seat forming member 18 of nozzle 17 and also by forming the needle point of valve 15 of the same character of material. In this manner, corrosion is eliminated and the accurate precision functioning of the valve over extended periods of use is assured.

It will also be evident that the various changes, modifications, substitutions, additions and eliminations, might be resorted to without departing from the spirit and scope of my invention and, hence, I do no wish to limit my invention in all respects to the exact and specific disclosures hereof except as may be required by specific intended limitations thereto included in any of the appended claims.

What I claim is:

1. In a regulating valve, in combination, a diaphragm mounted for flexing transversely in either direction, a fluid discharge nozzle, a needle valve for controlling discharge from said nozzle, a mounting for said needle valve including a rigidly supported regulating spindle, an axially movable valve support mounted on said spindle, said needle valve being mounted on said axially movable support for movements therewith toward and from said nozzle member, and motion multiplying transmission means connected between said diaphragm and said needle valve support for transmitting movements of the diaphragm to said support and valve thereon as magnified movements thereof relative to movements of said diaphragm.

2. In a regulating valve, in combination, a fluid discharge nozzle, a needle valve mounted for longitudinal movements toward and from said nozzle to control discharge of fluid from the latter, a regulating spindle rigidly mounted in substantial axial alignment with said needle valve, a valve support mounted on said regulating spindle for movement axially relative thereto, a spring mounted between said regulating spindle and said valve support and being adapted to continuously bias said valve support toward said nozzle, said needle valve being mounted on and carried by said valve support, a diaphragm mounted for flexing transversely in either direction, and motion multiplying transmission means operatively connected between said diaphragm and said valve support member for transmitting movements from said diaphragm to said support as magnified movements relative to the movements of said diaphragm.

3. In a regulating valve, in combination, a fluid discharge nozzle, a needle valve mounted for longitudinal movements toward and from said nozzle to control discharge of fluid from the latter, a regulating spindle rigidly mounted in substantial axial alignment with said needle valve, a valve support mounted on said regulating spindle in axial alignment therewith for movements in either direction axially relative thereto, said needle valve being mounted on said valve support for movements relative thereto, a spring operatively engaged between said needle valve and said support and yieldingly maintaining said valve in position on said support, a spring mounted between said regulating spindle and said valve support and being adapted to continuously bias said valve support in a direction toward said nozzle, a diaphragm mounted for flexing transversely in either direction, and motion multiplying transmission means operatively connected between said diaphragm and said valve support for transmitting movements from the diaphragm to said valve support as magnified movements of the support and valve thereon relative to the movements of said diaphragm.

THEOPHIL EICHMANN.

References Cited in the file of this patent

UNITED STATES PATENTS

| Number | Name | Date |
|---|---|---|
| 123,317 | Wiehl | Jan. 30, 1872 |
| 1,313,858 | Edge | Aug. 10, 1919 |
| 1,803,659 | Stanley | May 5, 1931 |
| 1,885,389 | Temple | Nov. 1, 1932 |
| 1,935,548 | Eggleston | Nov. 13, 1933 |
| 2,021,053 | Englebright | Nov. 12, 1935 |
| 2,338,760 | Denning | Jan. 11, 1944 |

FOREIGN PATENTS

| Number | Country | Date |
|---|---|---|
| 253,080 | Switzerland | Nov. 16, 1948 |
| 383,446 | Great Britain | Nov. 17, 1932 |
| 538,235 | Great Britain | July 25, 1941 |
| 609,942 | France | Aug. 26, 1926 |